R. M. ROOF.
CONTROL MEANS FOR INTAKES AND EXHAUSTS OF INTERNAL COMBUSTION ENGINES.
APPLICATION FILED FEB. 20, 1917.
1,301,007.
Patented Apr. 15, 1919.
4 SHEETS—SHEET 1.
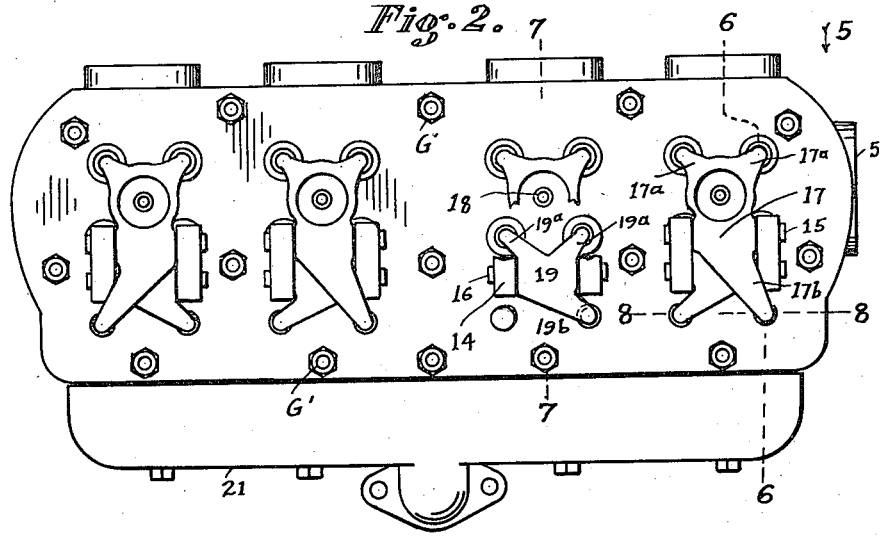
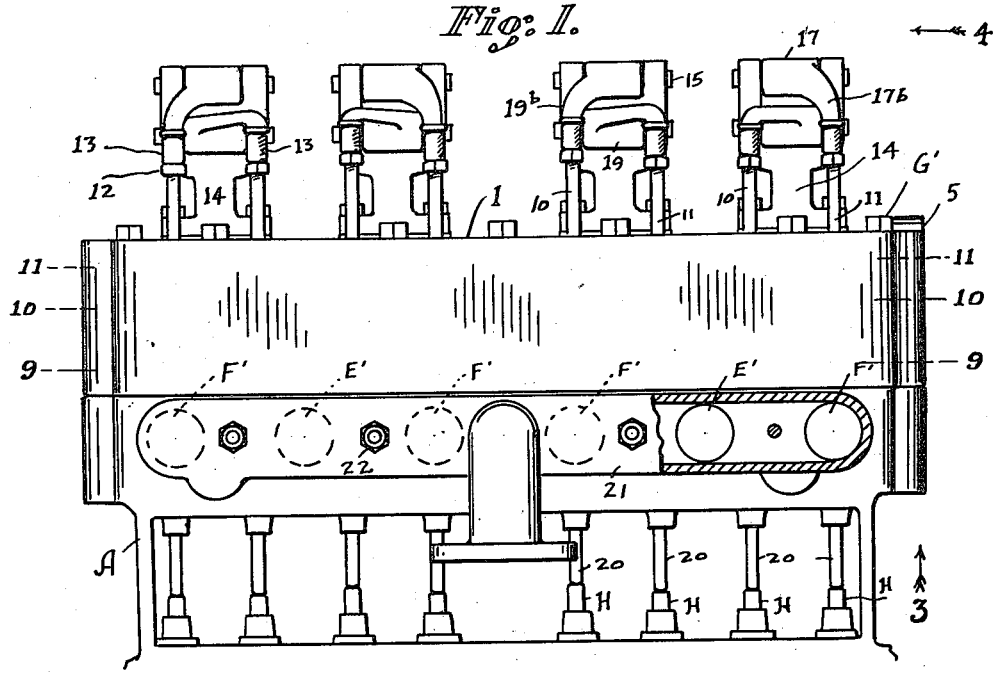
WITNESSES:
Ward Marshall
Rollie W. Lemington
INVENTOR
ROBERT M. ROOF.
BY Thomas L. Ryan
ATTORNEY.

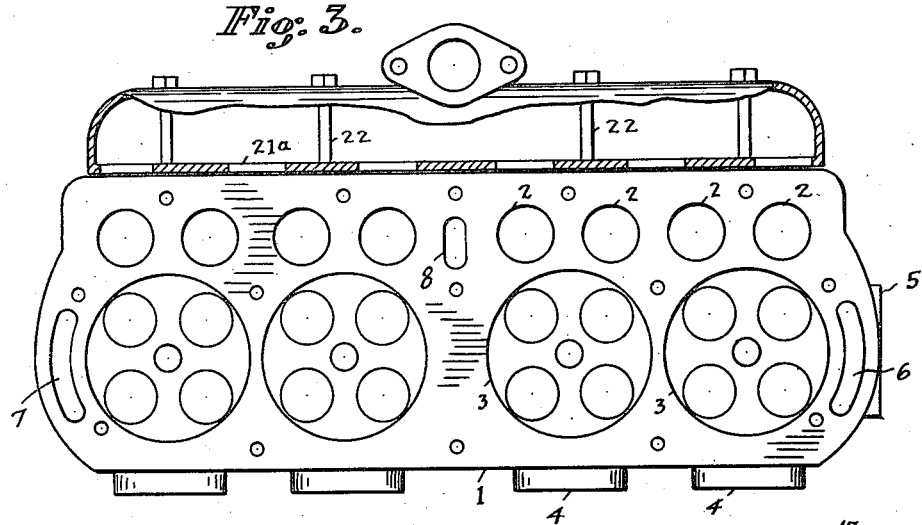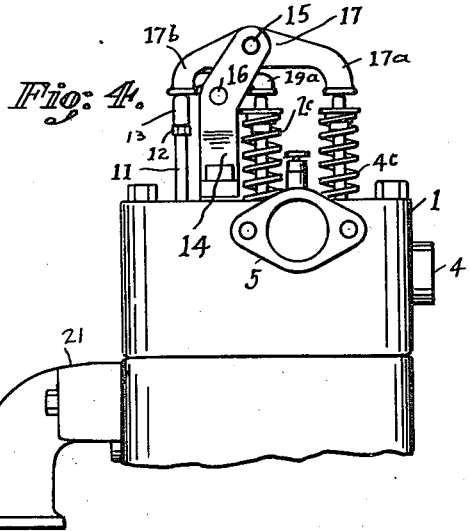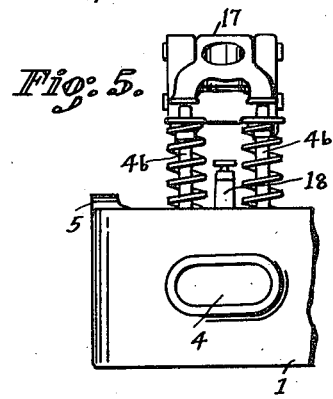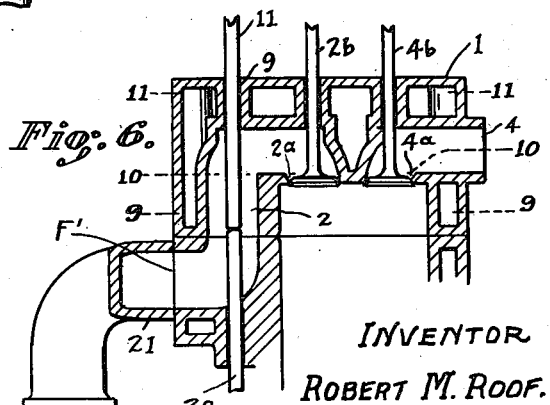

R. M. ROOF.
CONTROL MEANS FOR INTAKES AND EXHAUSTS OF INTERNAL COMBUSTION ENGINES.
APPLICATION FILED FEB. 20, 1917.
1,301,007.
Patented Apr. 15, 1919.
4 SHEETS—SHEET 3.
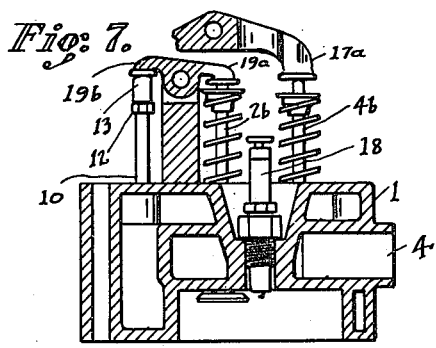
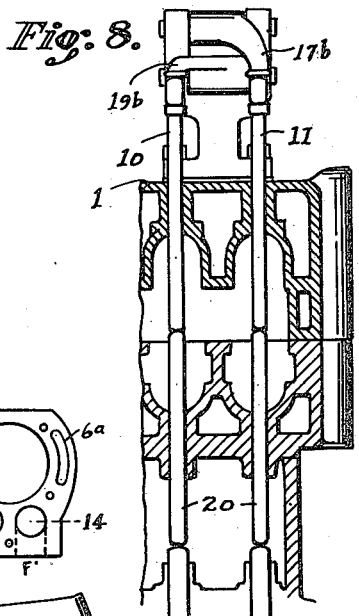
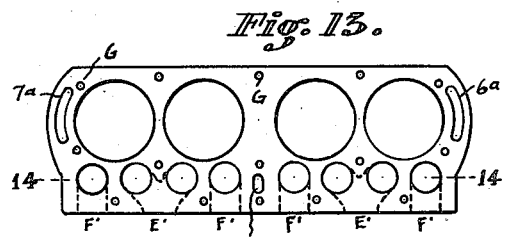
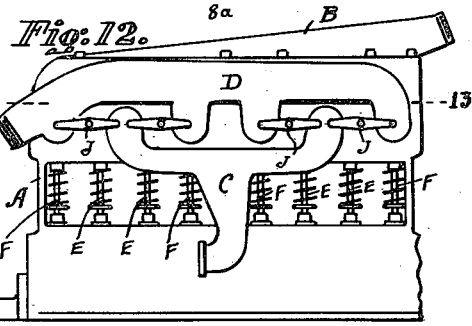
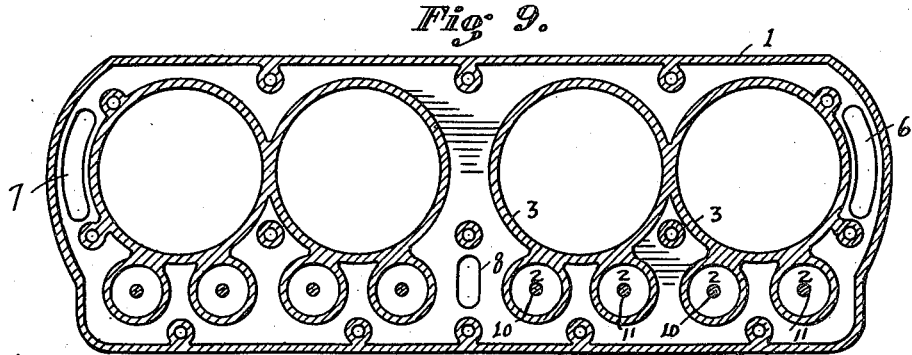
WITNESSES:
INVENTOR
ROBERT M. ROOF.
BY
ATTORNEY.

UNITED STATES PATENT OFFICE.

ROBERT M. ROOF, OF ANDERSON, INDIANA, ASSIGNOR TO LAUREL MOTORS CORPORATION, OF PHOENIX, ARIZONA, A CORPORATION OF ARIZONA.

CONTROL MEANS FOR INTAKES AND EXHAUSTS OF INTERNAL-COMBUSTION ENGINES.

1,301,007.            Specification of Letters Patent.     Patented Apr. 15, 1919.

Application filed February 20, 1917. Serial No. 149,786.

*To all whom it may concern:*

Be it known that I, ROBERT M. ROOF, a citizen of the United States, residing at Anderson, in the county of Madison and State of Indiana, have invented certain new and useful Improvements in Control Means for Intakes and Exhausts of Internal-Combustion Engines, of which the following is a specification.

This invention relates to improvements in internal combustion engines, and has reference especially to that class of engines in which the fuel and exhaust ports lead from the side of the engine body or block and open into the firing chambers arranged in the underside of the cylinder head member; the valves being operable to open and close the said ports, and being actuated by mechanisms therefor, operated by the engine.

The objects of my invention are accomplished by, and the invention is embodied in the new construction, combination and arrangement of parts described in this specification, defined in the appended claim, and illustrated in the accompanying drawings.

The several parts of the invention are identified by suitable characters of reference applied thereto in the different views in the drawings, in which—

Figure 1 is a front view of my invention applied in position in combination with an engine body of the kind described, a portion of the wall of the manifold being broken away.

Fig. 2 is a plan view of Fig. 1, parts of the valve operating means being broken away.

Fig. 3 is a view of Fig. 1 as seen from below same in the direction indicated by the arrow 3 in Fig. 1, a portion of the wall of the manifold being broken away.

Fig. 4 is an end view of Fig. 1 as seen in the direction indicated by the arrow 4 in Fig. 1.

Fig. 5 is a rear view of a portion of the cylinder head as seen in the direction of the arrow 5 in Fig. 2.

Fig. 6 is a vertical transverse sectional view on the line 6—6 in Fig. 2.

Fig. 7 is a vertical transverse sectional view on the line 7—7 in Fig. 2.

Fig. 8 is a vertical sectional view taken on the line 8—8 in Fig. 2 showing the arrangement of the auxiliary stem 20 which takes the place of the regular valve and stem E and F which is dispensed with by the use of this invention.

Fig. 9 is a horizontal sectional plan view of the cylinder head member taken on the line 9—9 in Fig. 1 and in Fig. 6.

Fig. 12 is a view showing a side elevation of the body portion of an engine of the class to which this present invention is applied, complete with its intake and exhaust manifold and the cylinder head member, and the valve stem push rods.

Fig. 13 is a top plan view taken on the line 13—13 in Fig. 12, the intake and the exhaust manifold, and the cylinder head having been removed.

Fig. 14 is a vertical sectional view taken on the line 14—14 in Fig. 13.

In Fig. 12 is shown the block portion of an engine of the class referred to, it having the usual arrangement of the intake manifold, and exhaust manifold, and the cylinder head member. In Fig. 13 is shown a plan view of the engine block, the manifold and the cylinder head member having been removed, so that a clear view of the upper openings of the ports is had. The dotted lines indicate the positions of the lateral openings of these ports. This model of engine is so well known that it may be considered a standard type of its class.

In the side view of this engine is shown the engine block A, the cylinder head member B, and the usual intake manifold C and the exhaust manifold D. The operation of the inlet valves $E^1$ and of the exhaust valves F is such that the gas from the intake manifold enters at the ports $E^1$ and the exhaust passes out through the ports $F^1$. It is obvious that the maximum volume of the explosive mixture available for use is that which may be passed through the inlet port $E^1$ for each cylinder.

My present invention has for its purpose to provide means for the control of the fuel inlet and of the exhaust, of such arrangement and function that the power and efficiency of the engine to which the invention may be applied, may be materially increased. In accomplishing this purpose, it is intended that no modification or change in any of the mechanism or actuating parts of the engine will be affected. It is proposed however, to provide a construction, combination and arrangement of parts comprising a manifold member, a cylinder head member and valve mechanisms whereby all of the aforesaid ports $E^1$ and $F^1$ may be utilized as intake ports, and the valve mechanisms therefor may be actuated by the regular actuating devices forming a part of the engine. The parts of the standard engine, as above described, to be disposed with, comprise the cylinder head B, the intake manifold C, and the exhaust manifold D, and the valves E, E and F, F and their springs.

This invention, which may be termed as a control means for the intake and exhaust of internal combustion engines, comprises a manifold member to embrace all of the lateral mouths of the ports $E^1$ and $F^1$; and a cylinder head member adapted to be secured to the engine block by bolts secured in the regular holes G (see Fig. 13) said head having inlet port openings to register with the upper mouths of the ports $E^1$ and $F^1$; and which said inlet ports open into the firing chambers that register above the cylinder bores, and there being exhaust ports leading from said chambers; valves for said inlet ports, valves for the exhaust ports, means to operate said valves, and power transmitting devices between said valve operating means and the regular valve actuating devices operated by the engine.

Figure 10:
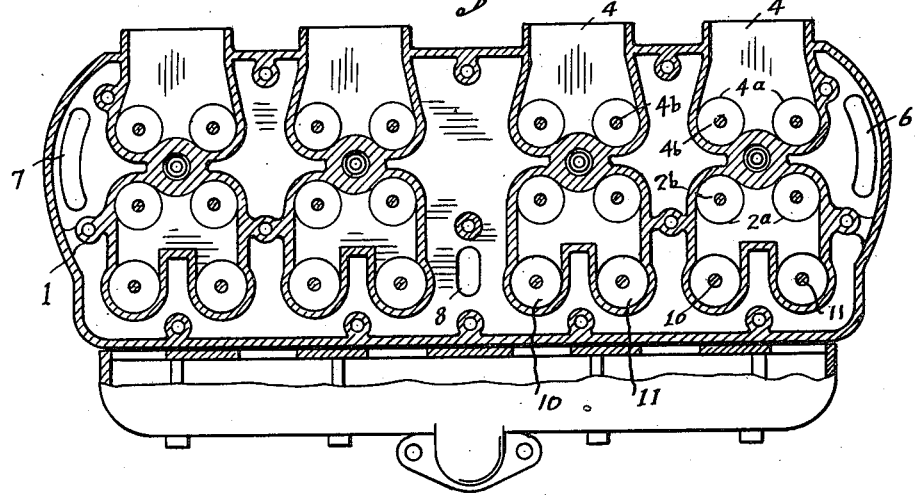
Fig. 10 is a horizontal sectional plan view of the cylinder head member (and manifold) taken on the line 10—10 in Fig. 1 and Fig. 6.
Figure 11:
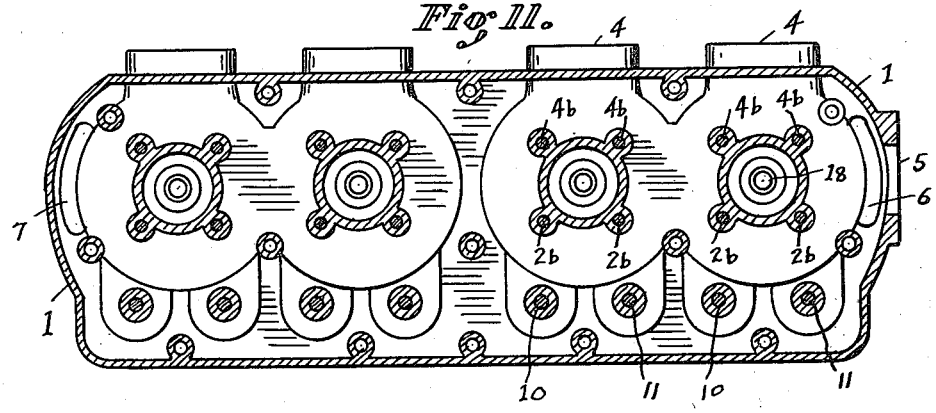
Fig. 11 is a horizontal sectional plan view of the cylinder head member taken on the line 11—11 in Fig. 1 and Fig. 6.

The cylinder head member 1 made of cast iron is of external contour the same as that of the top of the engine block, and may be designated as the cylinder head. The partition walls and webs constituting the interior of this cylinder head and which provide the port passage inlets and outlets presently to be described, are so arranged that ample space for the free circulation of water throughout the said head member is had. By reference to Fig. 3 which represents the underside of this cylinder head, the arrangement of the port openings and the firing chambers may be seen. Reference may also now be made to Fig. 6 and Fig. 9. The inlet ports 2 are spaced as shown, for registration with the upper mouths of ports $E^1$ and $F^1$. Two of these ports open into each of the chambers 3. The mouth of each of these ports at its entrance into the said chamber is beveled to form the usual seat $2^a$ for the inlet valve to be operated there. From each of said chambers 3 extend the wide and ample exhaust ports 4, the mouths of said ports 4 each being beveled to form the usual seat $4^a$ for the exhaust valves to be operated thereat. At one end of the cylinder head 1 is an opening 5 to which the water conduit (not shown) may be attached. By reference to Figs. 6, 7, 9, 10 and 11, it will be seen that free circulation of water is had throughout the cylinder head and through the openings 6, 7 and 8 which register with similar openings $6^a$, $7^a$ and $8^a$ in the engine block.

Bores extending vertically through said cylinder head and at registration with the centers of the ports 2 constitute guideways for push rod members to be presently referred to. Valves for the inlet ports 2 have their upwardly disposed stems $2^b$ slidingly disposed in bores therefor in the top portion of the cylinder head and are held normally at closed position by coil springs $2^c$. Valves for the exhaust ports having stems $4^b$ and which are similarly disposed as above described, are held normally at closed position by coil springs $4^c$.

In the bores 9 are disposed two sets of push rods; the rods 10 being actuated by the engine cams operating the valves for the inlet ports; and the push rods 11 being actuated by the cams operating the valves for the exhaust ports. Threaded on the upper end of each of these push rods is a set nut 12 above which is the adjusting head 13. The function of this adjustment feature will be presently referred to.

Adjacent to each group of the said valve stems is secured a standard 14 in which is supported a journal pin 15 and a journal pin 16. Journaled on the pin 15 is a trip lever 17. By reference to Fig. 2 it will be seen that this trip lever 17 has two arms $17^a$ whose ends register with the valve stems $4^b$; the arm $17^b$ registers above the push rod 11 (see Fig. 4). The body portion of trip lever 17 has an ample aperture through which access may be had to the spark plug 18 which, as shown in Fig. 7, is seated at the center of the firing chamber.

Journaled on the pin 16 is a trip lever 19. This trip lever has two arms $19^a$ whose ends register with the valve stems $2^b$, and an arm $19^b$ which registers above the push rod 10.

With the foregoing arrangement it is seen that by the actuation of the push rods 10, the two inlet valves that occupy the seats $2^a$ are lifted simultaneously. Similarly there is the lifting of the two exhaust valves that occupy the seats $4^a$ coincidently with each actuation of the push rod 11. Power transmitting connections between the said push rods and the regular valve actuating means operated by the engine cams, consist of stems 20 which are of suitable diameter and length, and which occupy the positions shown in Fig. 1 and Fig. 8. These stems occupy the guideways vacated by the dispensing with the valves E and F hereinbefore referred to. By means of the adjusting heads 13 carried by the push rods 10 and 11, the adjustment for the distance between the cam operated push heads H of the engine, and the trip levers 17 and 19, may be had.

Adapted to perform the function of a conduit from the carbureter (not shown) to convey the fuel gas into the said ports, is a manifold 21. This manifold is of the form and is proportioned for the ample volume area shown. Through its machined face which is adapted to rest at accurate contact with the external face of the wall of the engine block, are suitable openings 21$^a$ which register with the lateral mouths of the engine ports E$^1$ and F$^1$. This manifold is secured in position by bolts 22 threaded and of proper size to fit the threaded holes in the engine block and which accommodate the bolts J forming a part of the standard fastenings as shown in Fig. 12.

My invention complete and in readiness to be applied to use includes the cylinder head 1 and its connected parts; the manifold 21, and a set of eight stems 20.

To equip the engine with this invention, the head member B, intake manifold C, exhaust manifold D, and the valves E and F with their springs are first removed from the engine block, the latter then appearing as shown in Fig. 13.

The stems 20 are first disposed in the guideways vacated by the removal of the valves E and F. The cylinder head 1 is then set in place on the block, same being secured by bolts G$^1$ which are tightened into the holes G therefor. In this position the push rods 10 and 11 rest with their bottom ends at engagement with the stems 20. Such adjustment as may be necessary to obtain proper reach of these push rods to the heads of the arms of the trip levers 17 and 19 is obtained by manipulating the adjusting heads 13. The manifold is then bolted to position as shown.

By this arrangement and combination of parts there is such increase in carrying and delivery power of the fuel gas that a carbureter of increased capacity may be used. The total volume of gas necessary to fill the manifold and the ports E$^1$ and F$^1$ being at all times available, it is apparent that charges to the cylinders may be made in materially increased quantity. The handling of this larger quantity is provided for by the multiple valve arrangement hereinbefore described. With each actuation of push rod 10 there is the lifting of the two inlet valves from the seats 2$^a$, and with each actuation of the push rod 11 is the lifting of the two exhaust valves from seats 4$^a$. By the action of springs 2$^c$ and 4$^c$ the push rods 10 and 11, and stems 20 are retained at close contact against each other, so that the device operates silently and without lost motion.

With the large volume area of the exhaust ports the action of the exhaust is to maintain a partial vacuum in the cylinders; this, in turn induces an increase of suction force which stimulates the free flow of the engine gas. With the location of the spark plug centrally, as shown, and the introduction of the gas at substantially the center of the firing chamber, the efficiency in ignition and combustion is increased.

What I claim as my invention, and desire to secure by Letters Patent, is:—

A control means for the intake and exhaust of internal combustion engines, comprising a head member having firing chambers therein for the cylinders, inlet ports leading from the engine ports into the firing chambers, exhaust ports leading from said firing chambers, a spark plug for each firing chamber and located centrally and between the sets of said ports, valves for the inlet ports, valves for the exhaust ports, a spring for each of said valves to retain said valve at normally closed position, a push rod for the inlet valves, a push rod for the exhaust valves, a standard on said head member and located above each firing chamber, a trip lever journaled on said standard having its power arm to register with a push rod and its weight arm to register with the inlet valves, and trip lever journaled on said standard having its power arm to register with a push rod and its weight arm to register with the exhaust valves, there being an opening in said last named lever to afford access to the spark plug.

In testimony whereof I affix my signature in the presence of two witnesses.

ROBERT M. ROOF.

Witnesses:
　Thomas L. Ryan,
　Mabel Cranor.